(12) United States Patent
Ma et al.

(10) Patent No.: US 8,051,354 B2
(45) Date of Patent: Nov. 1, 2011

(54) REALIZATION METHOD FOR HARQ IN MULTIPLE FREQUENCY POINTS CELL

(75) Inventors: Zijiang Ma, Shenzhen (CN); Zhifeng Ma, Shenzhen (CN); Yincheng Zhang, Shenzhen (CN); Dapeng Li, Shenzhen (CN)

(73) Assignee: ZTE Corporation (CN)

( * ) Notice: Subject to any disclaimer, the term of this patent is extended or adjusted under 35 U.S.C. 154(b) by 838 days.

(21) Appl. No.: 12/091,292

(22) PCT Filed: Nov. 14, 2006

(86) PCT No.: PCT/CN2006/003052
§ 371 (c)(1),
(2), (4) Date: Apr. 23, 2008

(87) PCT Pub. No.: WO2007/056940
PCT Pub. Date: May 24, 2007

(65) Prior Publication Data
US 2008/0301514 A1 Dec. 4, 2008

(51) Int. Cl.
*G06F 11/00* (2006.01)
(52) U.S. Cl. .................. 714/748; 714/749; 375/260
(58) Field of Classification Search .................. 714/748, 714/749; 375/260
See application file for complete search history.

(56) References Cited

U.S. PATENT DOCUMENTS

| | | | |
|---|---|---|---|
| 7,532,600 B2 * | 5/2009 | Hu et al. | 370/335 |
| 7,672,250 B2 * | 3/2010 | Czaja et al. | 370/252 |
| 7,760,812 B2 * | 7/2010 | Liu et al. | 375/260 |
| 2007/0153928 A1 * | 7/2007 | Liu et al. | 375/260 |
| 2009/0300456 A1 * | 12/2009 | Pelletier et al. | 714/749 |

(Continued)

FOREIGN PATENT DOCUMENTS

CN 1689260 10/2005
(Continued)

OTHER PUBLICATIONS

3GPP Organizational Partners, 3GPP TR 25.848, V4.0.0., "3rd Generation Partnership Project; Technical Specification Group Radio Access Network; Physical layer aspects of UTRA High Speed Downlink Packet Access (Release 4)", Mar. 2001.
(Continued)

*Primary Examiner* — Philip Guyton
(74) *Attorney, Agent, or Firm* — Kolisch Hartwell, P.C.

(57) ABSTRACT

The present invention relates to a method for realizing HARQ in multi-carrier cell, comprising: when distributing high-speed shared resource for UE, Node B distributes the high-speed downlink packet service to N frequencies, and reports the information of the established physical channel, including the frequency information, to RNC and said UE; after Node B establishes the high-speed shared resource for said UE at N frequencies, it establishes N HARQ sub-entities on the HARQ entity built for said UE, each sub-entity independently processes the high-speed downlink packet service at one frequency; correspondingly, said UE also establishes N HARQ sub-entities on the HARQ entity; Node B configures parameters for each HARQ sub-entity and notifies the configuration information to RNC and said UE through upper-level signaling; Node B and UE complete their configuration for each sub-entity of HARQ entity according to the information, and realize the HARQ function in the service. The present invention can realize HARQ function on multiple frequencies simultaneously and is compatible with current protocol in TD-SCDMA system that utilizes multi-carrier HSDPA technique.

9 Claims, 3 Drawing Sheets

U.S. PATENT DOCUMENTS

2010/0095183 A1* 4/2010 Petrovic et al. ............... 714/748
2010/0260130 A1* 10/2010 Earnshaw et al. ............. 370/329
2011/0047430 A1* 2/2011 Feuersanger et al. ......... 714/748

FOREIGN PATENT DOCUMENTS

| CN | 1689261 | 10/2005 |
|----|---------|---------|
| EP | 1724948 A1 | 11/2006 |
| WO | 2005096522 A1 | 10/2005 |
| WO | 2006116102 A2 | 11/2006 |

OTHER PUBLICATIONS

Zhou et al., "TD-SCDMA system and simulation analysis of the program HARQ", J. of Chongqing Univ. of Posts and Telecomm. (Nat. Sci.) vol. 16, No. 1, pp. 42-46 (2004).

Keller, Matthias, Examiner, European Patent Office, Supplementary European Search Report, European Patent Application Serial No. EP 06 80 5235; search completion date: Jul. 14, 2010.

* cited by examiner

REALIZATION METHOD FOR HARQ IN MULTIPLE FREQUENCY POINTS CELL

TECHNICAL FIELD

The present invention relates to radio communication field, especially a method for realizing Hybrid Automatic Retransmission Request (HARQ) function in high-speed multi-media access control entity (MAC-hs) of time division code synchronization division multiple access (TD-SCDMA) system.

TECHNICAL BACKGROUND

One significant feature of the third generation mobile communication system is the unbalance of the traffics between uplink and downlink; the traffic of the downlink is generally heavier than that of the uplink. Based on this feature, the 3GPP (3rd Generation Partnership Project) introduces HSDPA (High Speed Downlink Packet Access) characteristic in the 3G standard, HSDPA technology is to provide high-speed downlink data service for multiple users and is suitable for the services downloading a large amount of information, such as multi-media and Internet etc.

According to the current 3GPP protocol, the cell corresponds to the earner one-to-one in the TD-SCDMA system. The method of configuring HSDPA related channel resource in single-carrier cell is: one HS-DSCH (High Speed Downlink Shared Channel), multiple HS-SCCHs (High Speed Shared Control Channel), and HS-SICHs (High Speed Shared Information Channel) that correspond to HS-SCCH one-to-one; when the network side configures HS-DSCH resource for one UE (User Equipment), it configures one to four HS-SCCHs to form one HS-SCCH set, and configures HS-SICHs that correspond to HS-SCCHs one-to-one; during the transmission process of HS-DSCH data, at each HS-DSCH TTI (Transition Time Interval), Node B transmits HS-DSCH related control information in one HS-SCCH channel, the UE obtains the information by reading the channel and sends out feedback information in one HS-SICH channel that corresponds to said HS-SCCH.

On the Node B side, MAC-hs selects one HS-SCCH to be used by a certain UE at each HS-DSCH TTI, namely to transmit the HS-DSCH related control information to said UE in said HS-SCCH channel. On the UE side, if no HS-SCCH in the HS-SCCH set is distributed to be used by the UE, the UE will continuously monitor this HS-SCCH set and search for the HS-SCCH that is practically distributed to it by reading "UE identity" information in the HS-SCCH and comparing it with the UE's own identity until the UE finds out the HS-SCCH channel that is distributed to itself; the next TTI starts, the UE only monitors and receives this HS-SCCH, uses the control information carried by this HS-SCCH to receive the HS-DSCH data, and sends out feedback information in one HS-SCCH channel that corresponds to said HS-SCCH until at a certain TTI, the UE can not find and read the UE identity that fits itself in said HS-SCCH or it can not find and read said HS-SCCH, then the UE remonitors the distributed HS-SCCH set until it finds out the HS-SCCH that is distributed to itself.

Among the features of HSDPA, by introducing AMC (Adaptive Modulation and Coding), HARQ technique as well as the related technology of reducing network processing delay, downlink packet service with higher speed is provided to increase the utilization ratio of frequency spectrum.

The AMC technique determines the current channel capacity according to the channel condition (Channel Status Information, CSI), the suitable modulation and coding scheme based on the channel capacity, etc., so as to transmit the information to the maximum extent and realize relatively high speed; moreover, the AMC is able to provide changeable modulation and coding solution according to the changes of channel quality of each user, thereby increasing the transmission speed and the utilization ratio of frequency spectrum.

HARQ is an error correcting method that, combines the traditional ARQ (Automatic Retransmission Request) technology with the EEC (Forward Error Correct) technology. In HARQ, the code sent out by the sending end can not only detect errors but also has certain ability of correcting the errors. After the receiving end receives the information, if the error is within the correction ability of the correcting code, the error will automatically be corrected; if the error is beyond the correction ability of the correcting code but it can still be detected, the receiving end will send the corresponding feedback, signals to the sending end, asking for a retransmission.

The HSDPA technology newly introduces HS-DSCH (High Speed Downlink Shared Channel) and MAC-hs (High Speed Multi-media Access Control) sub-layer. The MAC-hs is realized at the Node B on the network side to perform data transmission on the HS-DSCH transmission channel.

In Node B, each cell possesses one MAC-hs entity. The MAC-hs not only completes HS-DSCH data processing and dispatching, it is also responsible for the management and distribution of HSDPA physical resources. As shown in FIG. 1, MAC-hs entity comprises four function entities, i.e. flow control, dispatching/priority control, HARQ function and TFRC (Transport Format and Resource Choice).

1) Flow control: used to control the data flow from MAC-d (Dedicated Media Access Control) in order to satisfy the empty capacity. Through flow control, the time delay and congestion is reduced. For each MAC-d data flow having separate priority, the flow control is independent.

2) Dispatching/priority control: dispatching according to HARQ entity and priority. It determines new transmission and retransmission based on the channel and ACK/NACK feedback. Priority and the number of the data block are set.

3) HARQ: one UE (User Equipment) corresponds to one HARQ entity; one HARQ entity corresponds to multiple HARQ processes; one HS-DSCH TTI corresponds to one HARQ process.

4) TFRC (Transport Format and Resource Choice): selecting suitable transport format according to the channel condition and resource situation.

In the MAC-hs entity of Node B, each UE is distributed with one HARQ entity and N-Channel SAW (Stop and Wait Protocol) is executed; SAW protocol is called N-channel Stop and Wait Protocol for short, namely the HARQ entity executes N-Channel-SAW-HARQ protocol. One HARQ entity corresponds to multiple HARQ processes; in the current TD-SCDMA protocol of 3GPP, the HARQ entity of one UE can include eight HARQ processes at most; different HARQ processes are identified by process IDs; one HS-DSCH TTI corresponds to one HARQ process.

On the UE side, one UE has one MAC-hs entity, including four function entities of HARQ function, distributing, reordering and resolving, as shown in FIG. 2.

HARQ: responsible for the HARQ protocol, generating ACK/NACK (Data Block Feedback Information, ACK represents correct while NACK represents wrong) etc.

Distributing: distributing MAC-hs PDU (MAC-hs Protocol Data Unit) to the corresponding reordering queue.

Reordering: used to ensure that the data packets arrive at the upper layer in order. It orders the disordered data blocks generated by the HARQ entity and reports to the upper layer; one queue corresponds to one reordered entity; it performs reordering according to the number of the data block (TSN) of each priority queue. In order to prevent dead lock problems such as time-out from happening, the method such as timer can be used.

Resolving: resolving MAC-d PDU from MAC-hs PDU and sending it to MAC-d.

The HARQ entity of the UE and the HARQ entity in Node B are peer entities, including the same number of HARQ processes; each process forms the one-to-one protocol entity through the process ID and the process on the Node B side to receive the MAC-hs PDU (Protocol Data Unit) data packets.

The TD-SCDMA system in the current 3GPP protocol is a single-carrier system, namely one cell corresponds to one carrier: the frequency spectrum width for a single carrier is 1.6M; since TD-SCDMA employs TDD (time division duplex) scheme of relatively narrow band, the theoretical peak speed of a single carrier is 2.8 Mbps; the downlink peak speed provided by a single carrier is relatively low and can not satisfy the needs of operators for high-speed packet data service in the future. Therefore, some technical improvements needs to be performed based on single-carrier cell HSDPA technology to satisfy the higher needs of the operators for the high-speed packet data service.

In the multi-carrier cell, one cell has multiple frequencies, the maximum number of the users in this cell is N times (N represents the number of frequencies) of the maximum number of the users in single-frequency cell. In the multi-carrier cell, HSDPA resources of some UEs can be distributed on multiple frequencies simultaneously, namely the HS-DSCH of said user can be distributed on multiple frequencies simultaneously.

As a result, it is more complicated for Node B to dispatch and distribute HSDPA resources for the UEs in the multi-carrier cell than in single-frequency cell. Specifically, in the multi-earner cell, the MAC-hs of Node B manages more UEs and the flow control is relatively complicated; the dispatching for each UE by MAC-hs of Node B comprises: frequency information, time interval and code channel, namely, the data service of the UE can be carried on multiple time intervals on multiple frequencies as well as multiple code channels, requiring HARQ entitles being able to process HS-PDSCH (High Speed Physical Downlink Shared Channel) data on multiple frequencies simultaneously.

According to the 3GPP protocol, the number of the HARQ processes of one UE is eight. When in the multi-earner cell, the HS-PDSCH of the UE can be earned on multiple frequencies, the maximum number of HARQ processes is 8*N (N represents the number of the frequencies of the UE). Under such condition, the method of configuring HARQ process by simply using process ID and the method of configuring the memory parameters of the HARQ process in the current protocol are both unfeasible, and an effective solution is immediately needed.

SUMMARY OF THE INVENTION

The technical problem to be solved by the present invention is to provide a method for realizing high-speed multi-media access control entity (MAC-hs) in multi-carrier cell, which can realize HARQ function on multiple frequencies and is compatible with current protocol in TD-SCDMA system that utilizes multi-carrier HSDPA technique.

In order to solve the above technical problem, the present invention provides a method for realizing Hybrid Automatic Retransmission Request (HARQ) in multi-carrier cell, including the following steps of:

(a) distributing high-speed downlink packet service to N frequencies simultaneously by Node B when distributing high-speed shared resources for UE, N being a positive integer, and reporting the information of the established physical channel, including the information of the frequency, to Radio Network Controller (RNC) and said UE;

(b) establishing a HARQ entity for said UE by said Node B after establishing high-speed shared resources for said UE at N frequencies, and establishing N HARQ sub-entities based on the entity, each sub-entity processing the high-speed downlink packet service at one frequency independently; correspondingly, N HARQ sub-entities also being established on the HARQ entity by said UE;

(c) configuring parameters for each HARQ sub-entity by the Node B and notifying the configuration information to the RNC and said UE through upper-layer signalling, the Node B and the UE completing the configuration of each sub-entity of their respective HARQ entity according to said configuration information and realizing the HARQ function in the service.

Furthermore, the above method can also possess the following characteristic: the function of the HARQ sub-entity of said Node B is the same as that of the HARQ entity of Node B in a single-carrier cell, which is used to independently process the HARQ processes of high-speed physical shared channel at one frequency, complete the transmission and retransmission for the data on the high-speed physical downlink shared channel as well as the signaling on the high-speed shared control channel and high-speed shared information channel corresponding to said frequency, fill out corresponding information according to the queue identity indicated by dispatching/priority entity and the number of data block in each priority queue, and independently set process identity and execute SAW protocol.

Furthermore, the above method can also possess the following characteristic: the function of the HARQ entity of said UE is the same as that of the HARQ entity of UE in single-carrier cell; each HARQ sub-entity independently processes the HARQ processes on high-speed physical shared channel at one frequency, generates data block feedback information and channel quality instruction information which are carried on the high-speed shared information channel corresponding to the high-speed physical shared channel at said frequency, and reports the information to the network side.

Furthermore, the above method can also possess the following characteristic: each said HARQ sub-entity can process one or more processes.

Furthermore, the above method can also possess the following characteristic; the upper-level signaling in said step (c) means: the TDD information response message of the high-speed downlink shared channel sent by Node B to RNC and the HARQ information message sent by RNC to said UE.

Furthermore, the above method can also possess the following characteristic: the parameter configured by Node B for each HARQ sub-entity in said step (c) is the memory size distributed for each process of corresponding frequency.

Furthermore, the above method can also possess the following characteristic: in said upper-level signaling, the memory size information distributed for the process corresponding to the first frequency is configured according to the original layers, but with one frequency information unit being added; for other N−1 frequencies, a new frequency information unit is added, in which the corresponding frequency information of other N−1 frequencies and the memory size information distributed for the corresponding processes are configured.

In conclusion, the present invention provides a method for realizing HARQ entity in multi-carrier HSDPA technique for TD-SCDMA system, wherein in view of multiple frequencies being configured with HS-PDSCH channels, a HARQ sub-entity is configured separately for each of these frequencies in HARQ entity, each HARQ sub-entity independently completes the HARQ process, thereby there is no big influence on the current protocol and the function of HARQ entity in multi-carrier cell is better realized. All in all, the present invention can realize HARQ function on multiple frequencies simultaneously by modifying the HARQ entity and realize the configuration of HARQ process through process identity and frequency information.

PREFERRED EMBODIMENTS OF THE INVENTION

In the following, the realization method of the present invention will be described in further detail in combination with the preferred embodiment of the invention and drawings.

Figure 1:
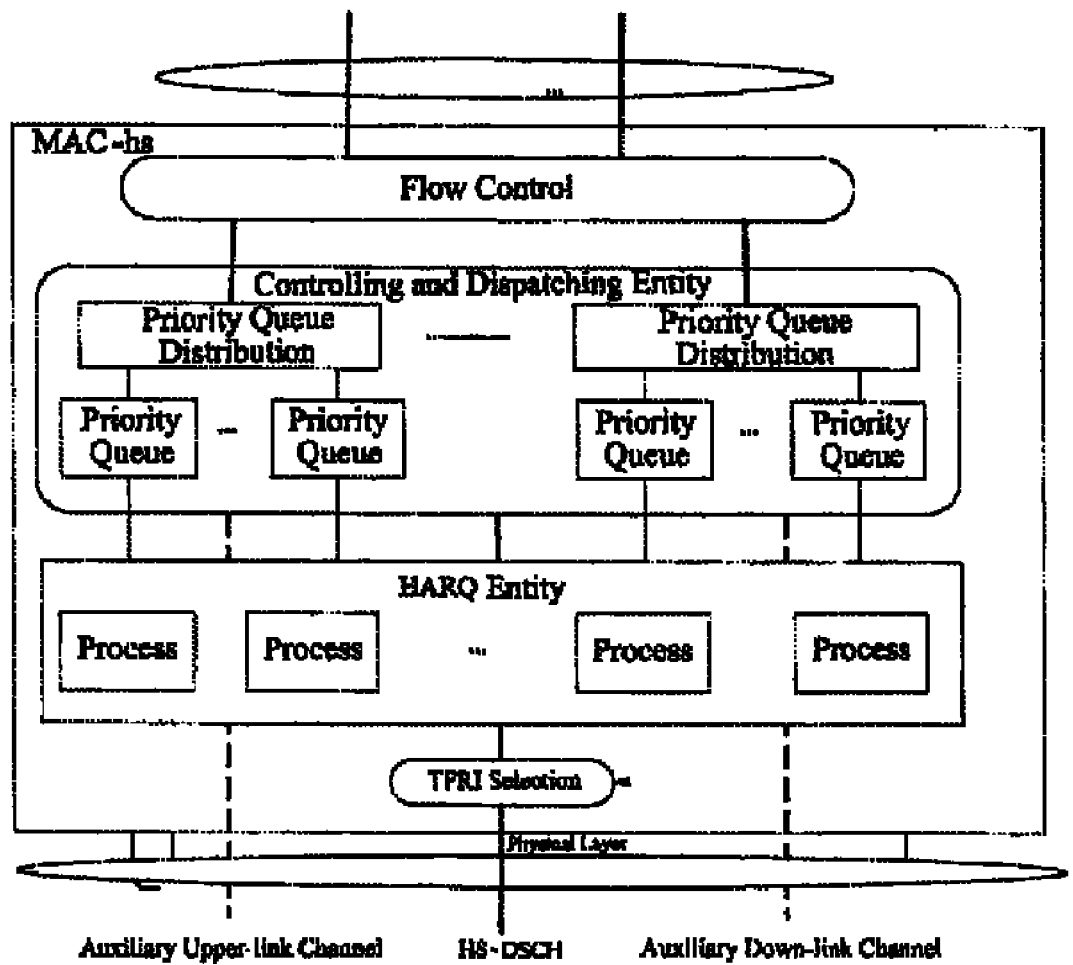
FIG. 1 is the function module diagram of MAC-hs entity on the Node B side.
Figure 2:
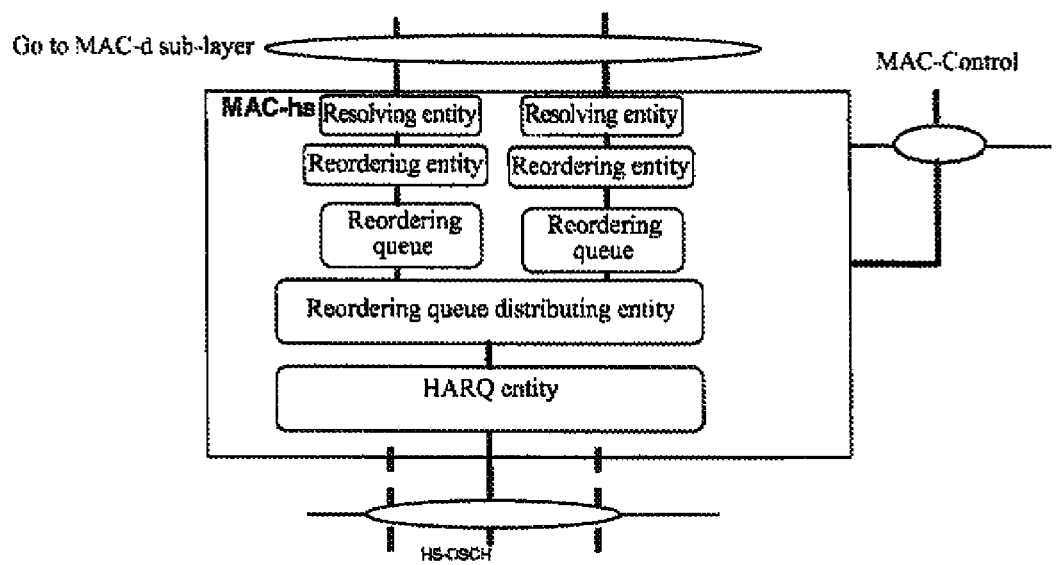
FIG. 2 is the function module diagram of MAC-hs entity on the UE side.
Figure 3:
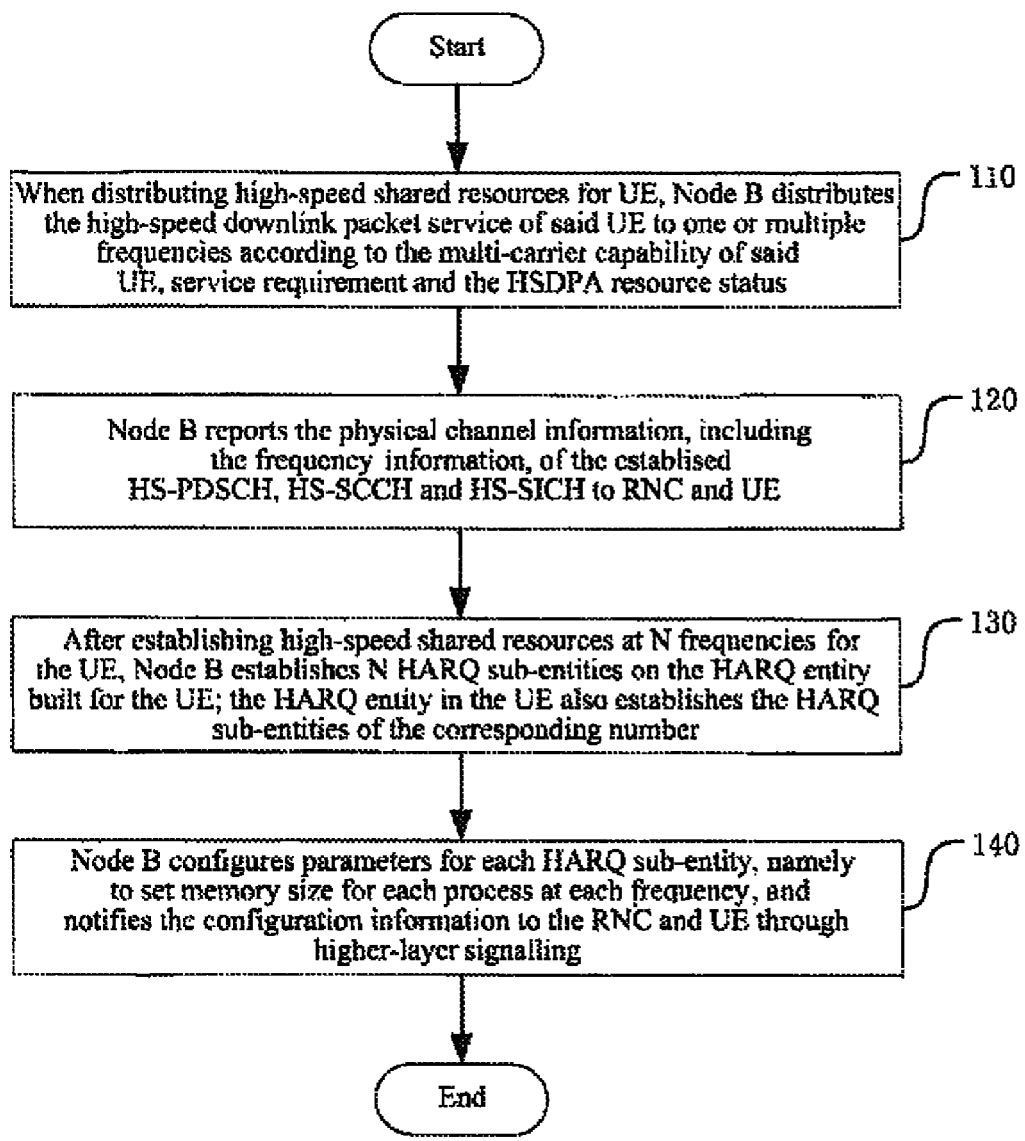
FIG. 3 is the flow chart of the method for realizing HARQ in multi-carrier cell according to an embodiment of this invention.

FIG. 3 shows the flow of an embodiment of the method for realizing HARQ in multi-carrier cell according to the present invention, including the following steps of:

Step 110, when Node B distributes high-speed shared resources for UE, it distributes the high-speed downlink packet service of said UE to one or multiple frequencies simultaneously according to the multi-carrier capability, service requirement and HSDPA resource status and the like of said UE;

Node B configures HS-PDSCH channel for all the frequencies, and distributes one HS-SCCH that matches the UE's own identity for HS-PDSCH of each frequency; each HS-SCCH is in pair with one HS-SICH.

Step 120, Node B reports the physical channel information of the established HS-PDSCH, HS-SCCH and HS-SICH, including the frequency information, to RNC and the UE;

Node B can indicate the frequency information of HS-PDSCH through upper-layer signaling or physical layer carrier of HS-SCCH, in other words. Node B can directly or indirectly configure the frequency information of HS-PDSCH through RRC signaling; alternatively, Node B can configure the frequency information of HS-PDSCH through the frequency information of HS-SCCH (the frequency information configured for HS-PDSCH by Node B is earned on the physical information of HS-SCCH).

Step 130, Node B establishes N HARQ sub-entities on the HARQ entity built for the UE after establishing high-speed shared resource for UE at N (N=1 or multiple) frequencies, each HARQ sub-entity independently processes the HS-PDSCH data of one frequency; correspondingly, correspondingly, HARQ entity in the UE also establishes HARQ sub-entities of corresponding number;

The MAC-hs sub-layer of the Node B distributes one HARQ entity for each UE; in this HARQ entity, the Node B distributes one HARQ sub-entity for HS-PDSCH of each frequency, namely, the high-speed downlink packet service of the UE is distributed to several frequencies there are several HARQ sub-entities in the HARQ entity, each HARQ sub-entity corresponds to one frequency and can have one or more processes.

The function of each HARQ sub-entity is the same as that of HARQ entity in single-carrier cell. Specifically speaking, each HARQ sub-entity independently processes the HARQ process of high-speed physical shared channel at one frequency, including the transmission and retransmission of the data on the HS-PDSCH and the signaling of HS-SCCH/HS-SICH corresponding to said frequency; each HARQ sub-entity possesses independent process identity and is able to fill out corresponding information according to TSN and the queue ID indicated by dispatching/priority entity, and sets process identity and executes SAW protocol.

The HARQ entity of the UE corresponds to the HARQ entity distributed by Node B to said UE. The HARQ entity of the UE also has the HARQ sub-entities of the corresponding number. Each HARQ sub-entity independently processes the HARQ process of high-speed physical shared channel at one frequency, specifically speaking, each HARQ sub-entity independently generates data block feedback information and channel quality instruction information which are carried on the HS-SICH corresponding to the HS-PDSCH of said frequency, and reports the information to the network side.

Step 140, Node B configures parameters for each HARQ sub-entity, namely setting memory size for each process at each frequency, and notifying the configuration information to RNC and the UE through upper-level signaling, Node B and the UE complete the configuration for the sub-entities of their respective HARQ entity according to said information, thus completing the HARQ function of said service.

Specifically speaking, the upper-level signaling means: the "HS-DSCH TDD information response" message in the NBAP protocol that is sent by Node B to RNC, and the "HARQ information" message in the RRC protocol that is sent by RNC to said UE.

In the HS-DSCH TDD information response message sent by Node B to RNC, the reporting of memory size configured for each process must include frequency information. Specifically speaking, in the original information unit ">>HARQ Memory Partitioning Information" of said message, a corresponding frequency unit ">>>UARFCN" needs to be added to indicate its corresponding frequency. For other frequencies, one new frequency information unit ">UARFCN Information" is added, in which the frequency information units and the HARQ memory partitioning information units corresponding to other N−1 frequencies are configured.

Considering that the configuration layers of the current single-frequency HS-PDSCH is timeslot→code channel, if the multi-frequency HS-PDSCH configuration layers, namely the method of frequency→timeslot→code channel, are completely followed, it needs to modify the protocol layer relations, which is evidently incompatible with the current protocol. As a result, this embodiment employs the above configuration scheme to configure the memory size information set for the corresponding process of the first frequency according to the original layers, but with one frequency information unit ">>UARFCN" added; for other N−1 frequency, one new frequency information unit ">>UARFCN Information LCR" is added and the configuration is performed according the layers of frequency→timeslot→code channel, thereby the configuration of N frequencies can be compatible with the single frequency. The related configuration of HS-DSCH TDD information response message is shown in the following table, in which the meaning of each unit can be referenced to the current protocol, and the new added units are underlined.

| | | | HS-DSCH TDD Information Response | | |
|---|---|---|---|---|---|
| IE | Presence | Range | IE Type and Reference | Semantics Description | |
| ... | ... | ... | ... | ... | |
| CHOICE HARQ Memory Partitioning | O (optional) | | | | |
| >Implicit | | | | | |
| >>Number of Processes | M (mandatory) | | INTEGER (1 ... 8, ... 8xN.) | The sum of all the HARQ processes on N frequencies, N being one to multiple, equally distributing memory | |
| >Explicit | | | | | |
| >>HARQ Memory Partitioning Information | | 1 ... <maxnoofHARQprocesses> | | The first instance of the parameter corresponds to HARQ process with identifier 0, ... | |
| >>>UARFCN | O | | | Only for Multi-Carrier Cell | |
| >>>Process Memory Size | M | | 9.2, 1.49D | | |
| >>UARFCN Information | O | | | Only for Multi-Carrier Cell | |
| >>>UARFCN | M | | | | |
| >>>HARQ Memory Partitioning Information | | 1 ... <maxnoofHARQprocesses> | | | |
| >>>>Process Memory Size | M | | | | |

Note:
maxnoofHARQprocesses: the maximum value of the HARQ process at one frequency In "HARQ Info" message in the RRC protocol that is sent by RNC to the UE, the reporting of memory size parameter configured for each process must comprise the frequency Information. Specifically speaking, in the original memory size information unit ">>Memory size" of said message, one corresponding frequency unit ">>>UARFCN" needs to be added to indicate its corresponding frequency. For other frequencies, one new frequency information unit ">UARFCN Information" is added, in which the corresponding frequency information units and the memory size information units of other N−1 frequencies are configured.

The related configuration of HARQ information message is shown in the following table, in which the meaning of each unit can be referenced to the current protocol, and the new added units are underlined.

| | | | | | |
|---|---|---|---|---|---|
| | | | HARQ Info | | |
| Information Element | Need | Multi | Type and Reference | Semantics Description | Version |
| Number of Processes | MP (mandatory) | | Integer (1 ... 8 ... 8*N) | The sum of all the processes on N frequencies | REL-5 |
| CHOICE Memory Partitioning | MP | | | | REL-5 |
| >Implicit | | | | Equally distributing memory based on the sum of the HARQ processes on N frequencies | REL-5 |
| >Explicit | | | | | REL-5 |
| >>Memory size | MP | <1 to MaxHProcesses> | | | REL-5 |
| >>>UARFCN | OP (optional) | | | Only for Multi-Carrier Cell | |
| >>>Process Memory Size | MP | | Integer (800 ... 16000 by step of 800, 17600 ... | | REL-5 |
| >>UARFCN Information | OP | | | Only for Multi-Carrier Cell | |
| >>>UARFCN | MP | | | | |

-continued

HARQ Info

| Information Element | Need | Multi | Type and Reference | Semantics Description | Version |
|---|---|---|---|---|---|
| >>>Memory size | MP | <1 to MaxHProcesses> | | | |
| >>>>Process Memory Size | MP | | | | |

Note:
MaxHProcesses: the maximum value of the sum of the processes at one frequency.

INDUSTRIAL APPLICABILITY

The present invention discloses a method for realizing HARQ in multi-carrier cell, solving the problem of realizing HARQ function at multiple frequencies simultaneously by way of modifying HARQ entity, and realizing the configuration of HARQ process through process identity and frequency information. When distributing high-speed shared resources for the UE, Node B distributes the high-speed downlink packet service to N frequencies; after Node B establishes high-speed shared resources for said UE at N frequencies, it establishes N HARQ sub-entities on the HARQ entity built for said UE; in view of multiple frequencies being configured with HS-PDSCH channels, a HARQ sub-entity is configured separately for each of these frequencies in HARQ entity, each HARQ sub-entity independently completes the HARQ process, thereby there is no big influence on the current protocol and the function of HARQ entity in multi-carrier cell is better realized. The realization method of the present invention is also compatible with the current protocol.

What we claim is:

1. A method for realizing Hybrid Automatic Retransmission Request (HARQ) in a multi-carrier cell, comprising the following steps of:
   (a) Node B distributing high-speed downlink packet service to N frequencies when distributing high-speed shared resources for a user equipment (UE), N being a positive integer, and reporting information of established physical channel, including frequency information, to a Radio Network Controller (RNC) and said user equipment;
   (b) the Node B establishing a Hybrid Automatic Retransmission Request entity for said user equipment after establishing the high-speed shared resources at N frequencies for said user equipment, and establishing N Hybrid Automatic Retransmission Request sub-entities based on the entity, each sub-entity independently processing high-speed downlink packet service at one frequency; correspondingly, said user equipment also establishing N Hybrid Automatic Retransmission Request sub-entities on the Hybrid Automatic Retransmission Request entity; and
   (c) the Node B configuring parameters for each Hybrid Automatic Retransmission Request sub-entity and notifying the configuration information to the Radio Network Controller and said user equipment through upper-layer signalling, the Node B and the user equipment completing configuration for each sub-entity of their respective Hybrid Automatic Retransmission Request entity based on said configuration information and realizing the Hybrid Automatic Retransmission Request function in the service.

2. The method of claim 1, wherein the function of the Hybrid Automatic Retransmission Request sub-entity of said Node B is the same as that of the Hybrid Automatic Retransmission Request entity of said Node B in a single-carrier cell, said Hybrid Automatic Retransmission Request sub-entity of said Node B is used to independently process Hybrid Automatic Retransmission Request processes of high-speed physical shared channel at one frequency, complete transmission and retransmission for data on high-speed physical downlink shared channel as well as signaling of high-speed shared control channel and high-speed shared information channel corresponding to said frequency, fill out corresponding information according to queue identity indicated by dispatching/priority entity and number of data block in each priority queue, and independently set process identity and execute Stop and Wait (SAW) protocol.

3. The method of claim 2, wherein each of said Hybrid Automatic Retransmission Request sub-entities can process one or more processes.

4. The method of claim 1, wherein the function of the Hybrid Automatic Retransmission Request entity of said user equipment is the same as that of the Hybrid Automatic Retransmission Request entity of said user equipment in a single-carrier cell; each Hybrid Automatic Retransmission Request sub-entity independently processes Hybrid Automatic Retransmission Request processes on high-speed physical shared channel at one frequency, generates data block feedback information and channel quality instruction information which are carried on high-speed shared information channel corresponding to said high-speed physical shared channel at said frequency, and reports the information to network side.

5. The method of claim 4, wherein each of said Hybrid Automatic Retransmission Request sub-entities can process one or more processes.

6. The method of claim 1, wherein the upper-level signaling in said step (c) means: TDD (time division duplex) information response message of high-speed downlink shared channel sent by the Node B to the Radio Network Controller as well as Hybrid Automatic Retransmission Request information message sent by the Radio Network Controller to said user equipment.

7. The method of claim 6, wherein the parameters configured by the Node B for each Hybrid Automatic Retransmission Request sub-entity in said step (c) is memory size distributed for each corresponding process of the frequency.

8. The method of claim 1, wherein the parameters configured by the Node B for each Hybrid Automatic Retransmission Request sub-entity in said step (c) is memory size distributed for each corresponding process of the frequency.

9. The method of claim 8, wherein in said upper-level signaling, the memory size information distributed for the corresponding process of the first frequency is still configured according to original layers, but with one frequency information unit added; for other N−1 frequencies, one new frequency information unit is added, in which the corresponding frequency information of the other N−1 frequencies and the memory size information distributed for the corresponding processes are configured.

* * * * *

UNITED STATES PATENT AND TRADEMARK OFFICE
CERTIFICATE OF CORRECTION

| | | |
|---|---|---|
| PATENT NO. | : 8,051,354 B2 | Page 1 of 1 |
| APPLICATION NO. | : 12/091292 | |
| DATED | : November 1, 2011 | |
| INVENTOR(S) | : Zijiang Ma et al. | |

It is certified that error appears in the above-identified patent and that said Letters Patent is hereby corrected as shown below:

On the Title page, new item [30] should be added immediately after item [65] and immediately prior to item [51] by inserting -- Foreign Application Priority Data Nov. 11, 2004   (CN)............................. 200510115380.4 -- therein.

Signed and Sealed this
Seventeenth Day of July, 2012

David J. Kappos
*Director of the United States Patent and Trademark Office*